Dec. 28, 1954 W. W. BOELENS ET AL 2,698,379

TRANSMISSION SYSTEM FOR STEREOPHONIC SIGNALS

Filed April 3, 1952 2 Sheets-Sheet 1

INVENTORS
Willem Wigger Boelens
Johannes Jacobus Zaalberg van Zelst
BY Fred M Vogel
AGENT Dec. 28, 1954 W. W. BOELENS ET AL 2,698,379

TRANSMISSION SYSTEM FOR STEREOPHONIC SIGNALS

Filed April 3, 1952 2 Sheets-Sheet 2

INVENTORS
Willem Wigger Boelens
Johannes Jacobus Zaalberg van Zelst
BY Fred M Vogel
AGENT

United States Patent Office 2,698,379

Patented Dec. 28, 1954

2,698,379

TRANSMISSION SYSTEM FOR STEREOPHONIC SIGNALS

Willem Wigger Boelens and Johannes Jacobus Zaalberg van Zelst, Eindhoven, Netherlands, assignors to Hartford National Bank and Trust Company, Hartford, Conn., as trustee Application April 3, 1952, Serial No. 280,414

Claims priority, application Netherlands April 28, 1951

14 Claims. (Cl. 250—6)

The present invention relates to transmission systems for stereophonic signals and transmitters and receivers for use in such systems.

For stereophonic transmission of signals use is frequently made of two sound recorders spaced apart by a certain distance at the transmitter end, the signals A and B at the sound recorders having relative intensity differences and time differences depending on the position of the source of sound with respect to the recorders, these differences producing primarily the stereophonic effect. At the receiver end these coherent signals A and B are supplied to sound reproducers spaced apart by a certain distance, so that the desired spatial sound image is obtained.

The invention relates to a transmission system for stereophonic signals, in which the coherent signals A and B from the sound recorders are emitted as modulations of the same carrier-wave frequency and, at the receiver end, supplied to separate reproducing devices; and to transmitters and receivers for use in this system. For broadcast purposes this transmission system must frequently fulfil the requirement that the signals outside the frequency band of about 9 kc./s. allotted to the transmitter concerned should by international agreement be attenuated such that broadcast transmitters adjacent in frequency are not disturbed.

The invention has for its object to provide inter alia a stereophonic transmitter, for example, for broadcast purposes, which may be obtained in a simple manner by completing an existing amplitude-modulation broadcast transmitter in a manner such that the stereophonic signals emitted by this transmitter can be reproduced stereophonically by a stereophonic receiver and that a conventional amplitude-modulation receiver can also provide a substantially undistorted reproduction. In the latter case, of course, no stereophonic reproduction is obtained. The invention furthermore provides two types of receivers for stereophonic reception. One type provides excellent stereophonic reproduction and the second type, giving a slightly lower, but satisfactory reproduction quality, is more simple in construction and hence lower in cost-price.

According to the invention the transmitter comprises two channels having amplitude modulators connected to a common carrier-wave oscillator and, on the output side, to an aerial system, the emitted oscillations from the two channels having a phase-shift of 90° relative to the carrier-wave oscillation. The first channel comprises a sum producer, which adds up the stereophonic signals A and B and an amplitude modulator without carrier-wave suppression controlled by the output signal A+B of the sum producer and the second channel comprising a difference producer subtracting the stereophonic signals A and B and an amplitude modulator having carrier-wave suppression, controlled by the output signal A—B of the difference producer via an integrating network, the elements of the second channel being proportioned for a power which is, at the most, ten percent of the power of the corresponding elements of the first channel. In the high-frequency part of the receiver, which has a bandwidth corresponding to that of a normal amplitude-modulation receiver (about 9 kc./s.) are, connected two channels having an amplitude detector and a frequency detector respectively, the sum signal A+B at the output of the amplitude detector and the difference signal A—B at the output of the frequency detector being supplied to a sum producer adding up these signals and a difference producer subtracting these signals, the signals A and B obtained by addition and subtraction being supplied to separate reproducing devices.

In order substantially to preclude a reaction of the two transmitting channels on each other, more particularly, to prevent the high output power of the first channel from adversely affecting the second channel, the outputs of the two transmitting channels are connected to the aerial system preferably by way of a diplexer, which provides a relative decoupling of the said outputs.

The receiver for excellent stereophonic reproduction is characterized in that it comprises a device for filtering out a carrier-wave oscillation, for example, a selective circuit, the amplitude detector being formed by a mixing stage and the frequency detector by a further mixing stage comprising a differentiating network included in the output circuit, the selected carrier-wave oscillations being supplied with a relative phase shift of 90° to these mixing stages.

The simple receiver is an amplitude-modulation receiver comprising an additional channel connected to the high-frequency part, having a bandwidth of about 9 kc./s., of the receiver, which comprises the cascade connection of an amplitude limiter and a frequency detector, the outputs of the two channels being connected through the aforesaid sum producer and difference producer to the separate reproducing devices.

Consequently, apart from the elements of an amplitude-modulation receiver, the stereophonic receiver described requires the use of the elements for the additional channel, a sum producer and a difference producer and an additional loudspeaker.

In order that the invention may be more clearly understood and readily carried into effect, it will now be described more fully with reference to the accompanying drawing.

Figure 1:
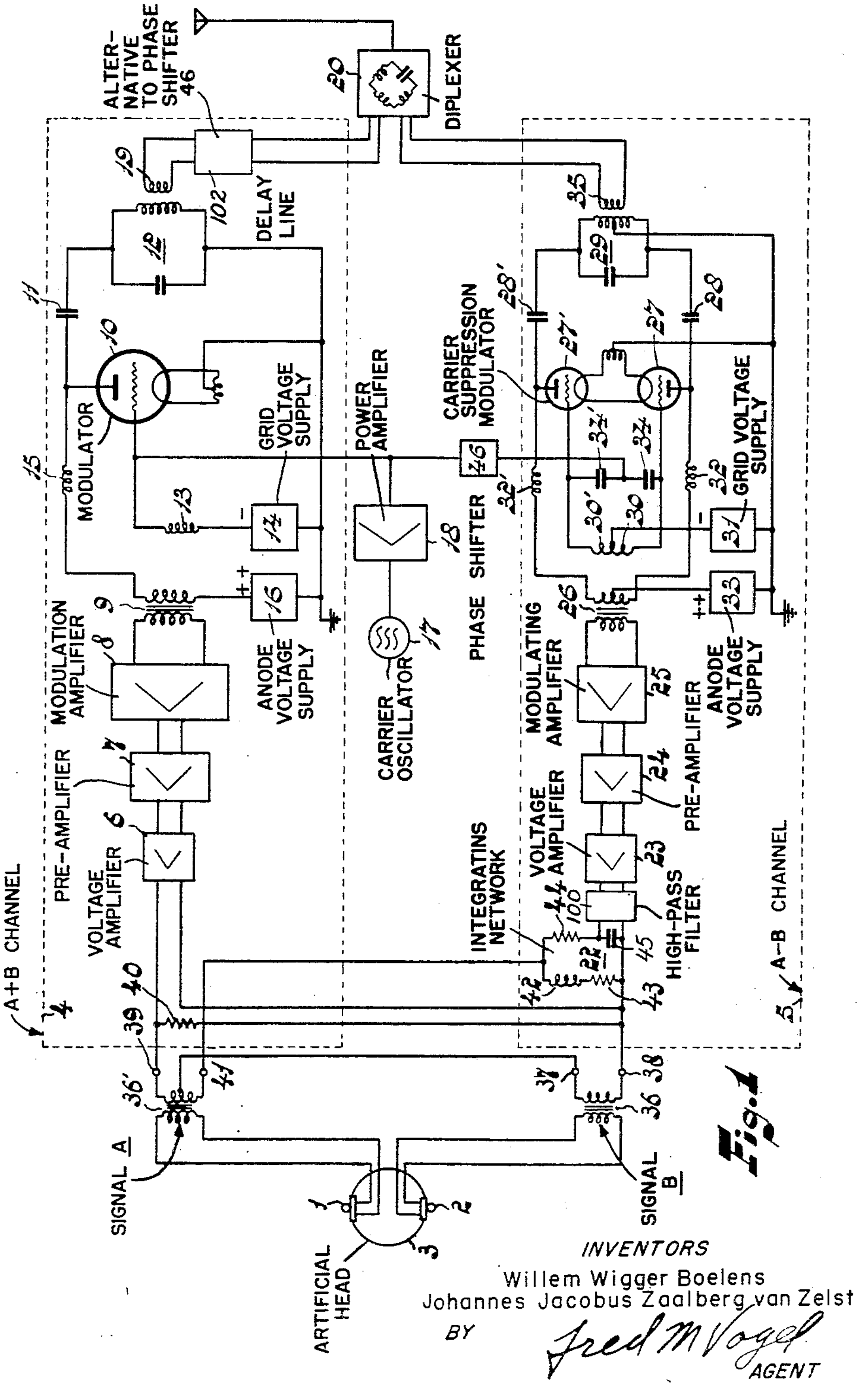
Fig. 1 shows in schematic form a stereophonic transmitter according to the invention.

Fig. 1 shows a stereophonic transmitter according to the invention, in which the coherent, stereophonic signals A and B are taken from two microphones 1 and 2, which are arranged in an artificial head. The low-frequency signals from the transmitter microphones 1 and 2 occupy, as a rule, a frequency range of, for example, 20 to 9000 c./s.

The transmitter comprises two channels 4 and 5, controlled by the signals A and B from the transmitter microphones 1 and 2, the emitted oscillations from the two channels having a phase shift of 90° relative to the carrier-wave oscillation. The first channel 4 comprises a sum producer which adds up the stereophonic signals A and B and which is connected in cascade to a voltage amplifying stage 6, a pre-amplifying stage 7 and a modulation amplifier 8, which is formed, for example, by a grid-current controlled class B push-pull amplifier. The amplified microphone signals appearing across the output circuit of the modulation amplifier 8 are supplied through an output transformer 9 as modulating voltages to an anode modulator operating without carrier-wave suppression. The anode modulator comprises a class-C-connected triode 10, the anode of which is connected via a blocking capacitor 11 to an output circuit 12, while the control-grid is connected via a high-frequency choke 13 to the negative terminal of a grid-voltage supply 14. The anode of the triode 10 is connected through a high-frequency choke 15 and the secondary winding of the output transformer 9 to an anode-voltage supply 16 and the high-frequency oscillations to be amplified and derived from an oscillator 17 are supplied via a power amplifier 18 to the control-grid. The coil 19, coupled with the output circuit 12, is connected to an aerial 21 via a network 20, which will be described more fully hereinafter.

The second transmitter channel 5 comprises a difference producer subtracting the stereophonic signals A and B, the output signal A—B of which is supplied to an integrating network 22, which is connected in cascade with a voltage-amplifying stage 23, a pre-amplifying stage 24 and a modulation amplifier 25. The modulation amplifier 25 provides the modulation voltage of an anode modulator operating with carrier-wave suppression through the intermediary of an output transformer 26. This modulator comprises two class C-connected triodes 27 and 27' in push-pull, of which the anodes are connected through blocking capacitors 28 and 28' to different ends of an output circuit 29, and the control-grids are connected through high-frequency chokes 30 and 30' to the negative terminal of a grid-voltage apparatus 31. The anodes of the triodes 27 and 27' are connected through high-frequency chokes 32 and 32' to the ends of the secondary winding of the transformer 26, a central tapping of which is connected to the terminal of an anode-voltage apparatus 33 and the high-frequency oscillation to be modulated, initiating from the oscillator 17 and amplified by the energy amplifier 18 are supplied through coupling capacitors 34 and 34' in co-phase to the control-grids. The amplitude-modulated oscillations with suppressed carrier-wave occurring across the output circuit 29 are supplied through a coupling coil 35 and the coupling network 20 to the aerial 21.

The sum producer and the difference producer, which form the inputs of the two transmitter channels, comprise in the embodiment shown two transformers 36 and 36', connected on the primary side to the individual microphones 1 and 2, the output terminal 37 of the transformer 36 being connected to a central tapping of the transformer 36'. The sum signal occurring between the terminals 38 and 39 is taken from a resistor 40 and the difference signal, occurring between the terminals 38 and 41, is supplied to the integrating network 22. In order to load equally the sum producer and the difference producer, the integrating network 22 comprises an ohmic input impedance of a value approximately equal to that of the resistor 40 throughout the frequency range to be transmitted. In the embodiment described the integrating network therefore comprises two parallel-connected branches, of which one is formed by the series-connection of the choke 42 and a resistor 43 and the other by the series-connection of a resistor 44 and a capacitor 45, the integrated output signal being taken from the capacitor 45.

As stated above, the emitted oscillations from the two channels must have a phase difference of 90° with respect to the carrier-wave oscillation. For this purpose the connecting lead between the carrier-wave amplifier 18 and the control-grids of the triodes 27 and 27' comprises a 90° phase-shifting network 46. This is not strictly necessary; as an alternative, for example, one of the output circuits of the amplitude modulators 10, 27 or 27' may be provided with a delay line 102, the electrical length of which is equal to one quarter wavelength of the common carrier-wave oscillation.

In the transmitting device described the elements of the channel 5 are proportioned for a power of not more than 10% (in the embodiment shown, for example, 2%) of the power of the corresponding elements of the channel 4. In order to preclude substantially a troublesome reaction of the modulator 10 on the modulators 27 and 27', where the output circuits 12 and 29 are connected to the aerial 21, these circuits are connected to the aerial 21 through a diplexer 20, which provides a relative decoupling of the said output. Such diplexers are known per se and comprise, in principle, a bridge circuit, having for example three inductive and a capacitative impedance, the outputs of the amplitude modulators 10, 27 and 27' being connected to diagonally opposite points of the bridge circuit, the other diagonal points being connected to the aerial 21 and an imitation impedance. The decoupling between the channels 4 and 5 may, as an alternative, be obtained, for example, by connecting the output circuits 12 and 29 to different aerials, the positions and radiation characteristics of which are chosen to be efficient for the purpose.

The proportioning of the elements of the channel 5 for a power which is appreciably lower than the power of the corresponding elements of the channel 4 is made possible by the combination of a number of measures which can be taken with regard to the stereophonic transmission.

For the lower signal frequencies to about 250 and 350 c./s. which normally occur with comparatively great amplitude in the sound image, an appreciable decrease in the signal-voltage amplitude to be transmitted is obtained in the embodiment described by supplying the coherent signals A and B from the microphones 1 and 2 to a difference producer. The difference signal A—B produced exhibits a low amplitude value for the said low frequencies with respect to the A+B signal, since for these frequencies the signals occurring at the microphones 1 and 2 have only small intensity and phase differences.

For the frequencies over 500 to 700 c./s. no appreciable amplitude reduction occurs owing to the production of the A—B signal, so that the amplitude maximum of the amplitude-frequency characteristic of the sound signals for the difference signal A—B does not lie at about 500 c./s., as is the case with the signals A, B or A+B, but shifts to higher frequencies, for example, 700 to 800 c./s. It should be noted that the maximum amplitude values for the frequencies of 700 to 800 c./s. are lower than those for frequencies of about 400 to 500 c./s. Thus the signal amplitudes to be passed through the A—B channel 5 are smaller than those of the A+B channel 4 and the A—B channel may thus be proportioned for a lower power than the A+B channel. However, taking only the difference producer into consideration, the output power required for the A—B channel must be at least 10% of the output power of the A+B channel in order to obtain a reasonable transmission in general.

With stereophonic reproduction high signal frequencies of for example 3000 to 4000 c./s. and more play a comparatively unimportant part with respect to the stereophonic effect and they may even give rise to interfering stereophonic effects.

In other words, for sterophonic reproduction particularly signal frequencies from about 200 to 300 c./s. to about 3500 to 4000 c./s. are important and for higher signal frequencies their importance for the sterophonic effect decreases rapidly in accordance with an increasing frequency.

According to the invention this condition is utilised by supplying the A—B signal through a signal-frequencies integrating network, of which the time constant (or the limit frequency) is chosen to be suitable, i. e. such that the aforesaid maximum at about 700 to 800 c./s. in the amplitude frequency characteristic for the A—B signal is considerably reduced or shifted to a lower frequency range. By using the integrating network in the A—B channel 5 the signal level to be passed through this channel is restricted in a manner such that for the A—B channel, at least when a modulator operating with carrier-wave suppression, is used, an output power of less than 10% of that of the A+B channel is sufficient.

The high-frequency power required for the A—B channel 5 varies with the limit frequency of the integrating network 22; it decreases with a decrease in limit frequency. Of course, the limit frequency cannot be decreased at will. Provision must be made for a reasonable signal-noise ratio for the A—B signal for the frequencies which are important for the stereophonic effect. In practice a suitable value of the limit frequency of the integrating network is, for example, 200 to 300 c./s.

The integrated difference signal modulates a carrier wave in amplitude in the A—B channel with carrier-wave suppression, this carrier-wave having a phase shift of 90° with respect to the amplitude-modulated carrier-wave in the A+B channel without carrier-wave suppression. Assuming the construction of the two amplitude modulators to be suitable, no sideband frequencies outside the amplitude-modulation spectrum of about 9 kc./s. are produced in the two channels. This also applies to the modulation spectrum after the output oscillations of the A+B channel are superimposed on those of the A—B channel. However, with regard to the 90° phase-shifted carrier-wave in the A—B channel, the output oscillations of this channel represent an angular modulation of the carrier-wave of the A+B channel, i. e. a frequency modulation, since the difference signal A—B is supplied through an integrating network to the modulator in the A—B channel. As will be obvious after the remarks on the modulation spectrum, we are concerned here with a frequency modulation having a very small sweep (narrow band frequency modulation), which is otherwise not identical with normal frequency modulation owing to the complete absence of higher-order sideband frequencies, which is of importance for the construction of the receiver, as will be explained more fully hereinafter.

At the receiver end the A+B signal can be obtained by means of a conventional amplitude detector. If the A—B channel of the transmitter has not given a carrier-wave component, the A—B sideband oscillations will substantially not contribute to the output signal of the amplitude detector, to which all emitted oscillations are supplied. Consequently, the stereophonic transmission may be received without objection by means of a conventional amplitude-modulation receiver, although, of course, without stereophonic reproduction.

If the transmitter were constructed such that the carrier-wave is suppressed in the A+B channel and that only the carrier-wave of the A—B channel is emitted, an amplitude detector at the receiver end would produce only the A—B signal. Similarly with the construction of the transmitter described above frequency detection of the emitted oscillations produces only the A—B signal and in the case of carrier-wave suppression in the A+B channel only the A+B signal.

As soon as the two transmitter channels contribute to the total emitted carrier-wave, both amplitude detection and frequency detection of the emitted oscillations supply a mixture of the A+B signals and the A—B signals, in other words, cross talk occurs between the A+B channel and the A—B channel in a measure which varies with the phase of the total carrier-wave with respect to, for example, the carrier-wave component of the A+B channel only.

In order to reduce such cross talk, which also interferes with non-stereophonic reception, in the transmitter construction shown, to an interference free level, it is necessary to provide that the carrier-wave component across the output of the A—B channel is substantially negligible with respect to the carrier-wave component supplied by the A+B channel. This is obtained, since the power of the carrier-wave supplied to the A—B channel is only a fraction of that of the carrier-wave of the A+B channel and since, furthermore, carrier-wave suppression is effected in the modulator in the A—B channel.

Another form of cross talk, which is particularly of importance for stereophonic transmission, is constituted by the relatively unequal phase course for the low-frequency signals in the transmission channels, which are understood to comprise the associated transmitter and receiver channels. For a reason to be described more fully with reference to the receivers, the contributions of the transmitter channels to this difference in the course of the phase are preferably a small fraction, for example, 1/10 of the maximum difference permissible in the complete system. It is particularly for this reason that the loads of the sum producer and the difference producer are equalized throughout the frequency range to be transmitted by means of the resistor 40 and the network 22.

It should finally be noted that recovery of the carrier-wave oscillation at the receiver end to ensure excellent stereophonic reproduction is rendered difficult by the "frequency modulation" of the emitted carrier-wave oscillations, owing to the low frequencies of the difference signals. Also with regard to the fact that these frequencies contribute only little to the stereophonic effect, they may be completely suppressed by means of a high pass filter 100 having a limit frequency of, for example, 200 to 300 c./s., included in the low-frequency part of the A—B channel.

Figures 2, 3:
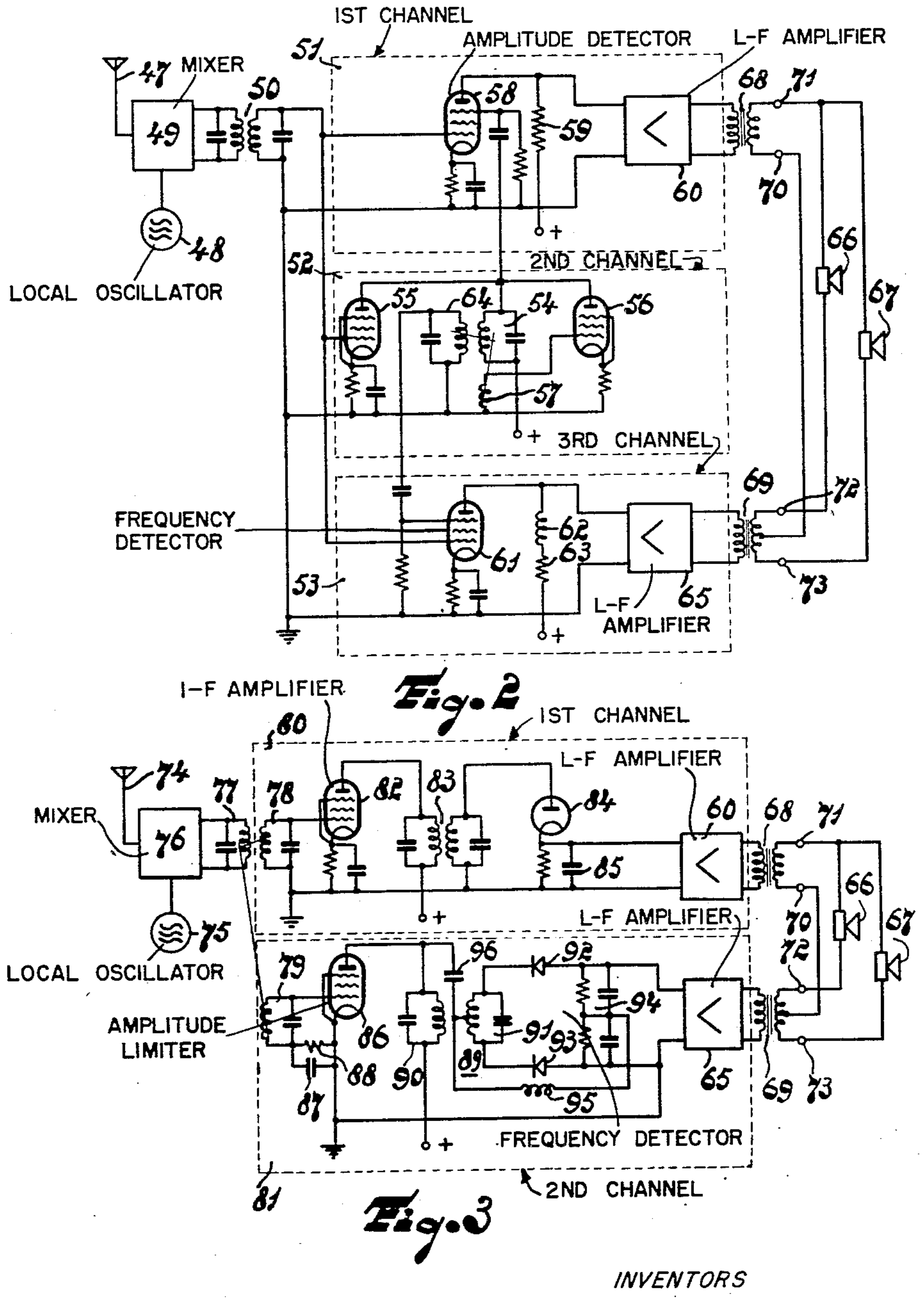
Fig. 2 shows schematically a first type of stereophonic receiver according to the invention and Fig. 3 shows schematically a second, simpler type of a stereophonic receiver according to the invention.

Fig. 2 shows the type of receiver according to the invention for perfect stereophonic sound reproduction of signals transmitted by a transmitter as shown in Fig. 1.

The high-frequency signals received through an aerial 47 are supplied to a mixing stage 49, connected to a local oscillator 48, whose output circuit, having usual bandwidth of about 9 kc./s. is constituted by a bandpass filter 50. The latter is connected in parallel with the inputs of three channels 51, 52 and 53, which contain in this order an amplitude detector, a device for filtering out the carrier-wave oscillation and a frequency detector.

The channel 52, which serves to filter out the carrier-wave oscillation, comprises a circuit 54 tuned to the carrier-wave frequency and constituting the output circuit of a pentode 55, connected as an intermediate-frequency amplifier to the bandpass filter 50. The circuit 54 is negatively damped, since it is included in the anode circuit of a pentode 56, the control-grid of which is regeneratively coupled with the circuit 54 by way of a coil

57. By suitable adjustment of the degree of feedback a very narrow bandwidth may be obtained for the circuit 54.

Since the receiver must be tuned very accurately, the use of automatic frequency correction (A. F. C.) is highly desirable for practical reasons.

It should be noted that the carrier-wave without sideband frequencies may be obtained at the receiver end, as an alternative, not by means of filtering, but, for example, by means of a local carrier-wave oscillator, of which the frequency and the phase are stabilised by means of an A. F. C.-circuit on the incoming carrier-wave oscillation. The incoming carrier-wave is then supplied, for example, through a circuit tuned to the carrier-wave to a mixer operating as a phase detector, in which it is compared with an oscillation from the local carrier-wave oscillator, the output voltage of the mixer being supplied through a lowpass filter as a control-voltage to a frequency corrector coupled with the local oscillator.

The channel 51 comprises a mixer formed by a pentode 58, operating as an amplitude detector, the incoming signals being supplied to the control-grid and the filtered carrier-wave from the selective circuit 54 to the suppressor grid. Since the filtered carrier-wave is in co-phase with the incoming carrier-wave for the sum signal A+B, the low-frequency sum signal A+B is produced across the output circuit of the mixer 58, constituted by a resistor 59 and then amplified in a low-frequency amplifier 60.

The channel 53 comprises a frequency detector having a mixer, for example, a hexode or a pentode. In the embodiment shown the mixer is formed by a pentode 61, the anode circuit of which comprises a differentiating network constituted by the series combination of a coil 62 and a resistor 63. The incoming signals from the bandpass filter 50 are supplied to the control-grid of the pentode 61 and the suppressor grid is connected through a 90° phase-shifting network to the resonant circuit 54. In the embodiment described above the phase-shifting network is constituted by a resonant circuit 64, connected inductively to the circuit 54 and tuned to the carrier-wave frequency. Since the mixed voltage supplied to the suppressor grid of the pentode 61 corresponds in frequency and in phase with the carrier-wave of the integrated difference signal A—B, emitted in amplitude-modulation with carrier-wave suppression, an anode current is produced in the pentode 61, which varies in the rhythm of the integrated difference signal A—B. Consequently, a low-frequency voltage is produced across the differentiating network 62, 63, the value of this voltage corresponding with the initial low-frequency difference signal A—B. This is supplied to a low-frequency amplifier 65 for amplification.

Since the demodulation process in the receiver shown in Fig. 2 is exactly reciprocal with the modulation process carried out at the transmitter end, an excellent reception of the A+B signals and of the A—B signals may be obtained. In order to obtain stereophonic sound reproduction, the sum signal A+B and the difference signal A—B occurring across the outputs of the low-frequency amplifiers 60 and 65 respectively are supplied in common to a sum producer adding up these signals and a subtracting difference producer, the coherent signals A and B obtained by addition and subtraction being supplied, if desired, through separate volume control circuits to separate reproducing devices 66 and 67.

The sum producer and the difference producer are constituted by transformers 68 and 69 respectively, the primary sides of which are connected to the outputs of the low-frequency amplifiers 60 and 65, an output terminal 70 of the transformer 68 being connected to a central tapping of the transformer 69. The two stereophonic signals A and B are taken from the other terminal 71 of the transformer 68 and the outer terminals 72 and 73 of the transformer 69 respectively.

If, in the device decribed above, the amplitude of the carrier-wave oscillation supplied to the suppressor grids of the mixers 58 and 61 is sufficiently great with respect to the signals supplied to the control-grids and if it has the correct phase, the output voltages of the mixing stages reproduce accurately the sum signal A + B and the difference signal A—B.

Fig. 3 shows the type of a simple stereophonic receiver according to the invention.

In this embodiment the signals received through the aerial 74 are supplied to a mixing stage 76, connected to a carrier-wave oscillator 75; the output circuit of this stage is designated by 77. The circuit 77 is coupled inductively with two separate resonant circuits 78 and 79, which constitute the inputs of two channels 80 and 81. The channel 80 comprises an intermediate-frequency amplifier 82, the output bandpass filter 83 of which is connected to a diode detector 84, having an output impedance 85.

The channel 81 comprises the cascade connection of an amplitude limiter and a frequency detector. The amplitude limiter comprises a pentode 86, connected as an intermediate-frequency amplifier, the control-grid being connected through a resistor 88, shunted by a capacitor 87, to the cathode, while the output circuit is constituted by a bandpass filter 89, comprising the circuits 90 and 91, which form part of a frequency detector. The frequency detector is of a type known per se for detection of normal frequency-modulation transmission and comprises two rectifiers 92 and 93, connected to the ends of the circuit 91 and interconnected by an output impedance 94. A central tapping of the output impedance 94 is connected through a high-frequency choke 95 to a central tapping of the circuit 91, which is connected through a blocking capacitor 96 to an end of the circuit 90.

If the signals modulated in amplitude by the sum signal A+B and the signals modulated in frequency by the difference signal A—B occur across the output circuit 77 of the intermediate frequency stage 76, having a normal bandwidth of about 9 kc./s., the low-frequency sum signal A+B is produced across the output impedance 85 of the diode detector 84, as will be obvious without further explanation.

The oscillations from the circuit 77 produce across the network 87, 88 of the amplitude limiter 86, included in the control-grid circuit a grid bias voltage varying with the sum signal A+B, supporting a limiting effect of the pentode 86. If the network 87, 88 is efficiently proportioned, an oscillation modulated in frequency by the difference signal is produced across the output bandpass filter 89 of the amplitude limiter, the amplitude modulation of these oscillations being largely suppressed. The low-frequency difference signal A—B then occurs across the output impedance 94 of the frequency detector. It should be noted that an additional amplitude limiter may be connected in cascade with the amplitude limiter 86.

As stated with reference to the A—B transmitting channel, the A—B sideband signals represent, owing to the absence of higher-order sideband frequencies, no normal angular modulation of the emitted carrier-wave; by using a strong limitation or amplitude modulation feedback in the receiving channel distortions otherwise involved in the use of a conventional frequency-modulation detector are avoided to a great extent.

In order to obtain stereophonic sound reproduction the signals occurring across the output impedances 85 and 94 of the amplitude detector and the frequency detector are supplied in a manner similar to that described with reference to the receiver shown in Fig. 2 through a sum producer and a difference producer to separate sound reproducers 66 and 67. Corresponding elements are designated by the same reference numerals.

In the receivers described above the coherent signals A and B are obtained by addition and subtraction of the sum signal A+B and the difference signal A—B. If the transmission channels for the low-frequency signals are not equal in phase, cross talk occurs owing to the aforesaid addition and subtraction. It has been found by experiment that with stereophonic transmission an appreciable value of cross-talk (for example, a cross talk level of —15 dbs to —20 dbs) is permissible. Since the transmitter channels, as is described above, have a very small relative phase difference, a considerably greater tolerance is permitted at the receiver end. This is an important advantage with the mass production of the receivers.

In the embodiments described above the sum producer and the difference producer at the transmitter end and at the receiver end are constituted by two mutually coupled transformers. These sum producers and difference producers may, as an alternative, be constructed in a different way, for example, by means of two low-frequency amplifiers, separated at the output, one signal being supplied in co-phase and the other signal in phase opposition to the control-grids of the amplifying tubes. As an alternative, use may be made for this purpose of networks comprising resistors.

It will be obvious that in the receivers described above either the A—B branch or the A+B branch may be made inoperative, if only reception of amplitude-modulated or of frequency-modulated signals is aimed at.

What we claim is:

1. In a stereophonic system wherein coherent stereophonic signals A and B are sent out as modulations on a common carrier; a transmitter comprising first and second channels, the first channel including a sum producer for adding the signals A and B to produce an output signal A+B and a first amplitude modulator coupled to the output of said sum producer, said second channel including a difference producer subtracting signals A and B to produce an output signal A—B, a carrier-wave suppression second amplitude modulator and an integrating network coupling the output of said difference producer to said second modulator, a carrier wave oscillator to said first and second modulators, means to impart a 90° phase displacement to the carrier wave conveyed in the first channel relative to that in the second channel, said second channel being proportioned to produce a power output not exceeding 10% of the power output of the first channel, and an antenna system coupled to the outputs of the first and second channels; and a receiver comprising two channels having an amplitude detector and a frequency detector respectively, the amplitude detector yielding the sum signals A+B and the frequency detector the difference signals A—B, a sum producer and a difference producer coupled in common to said detectors to recover the coherent signals A and B, and means coupled to said producers to reproduce separately said coherent signals.

2. A system, as set forth in claim 1, wherein the channels in said transmitter and the channels in said receiver have corresponding phase relations for low-frequency signals.

3. In a stereophonic system wherein coherent stereophonic signals A and B are sent out as modulations on a common carrier; a transmitter comprising first and second channels, the first channel including a sum producer for adding the signals A and B to produce an output signal A+B and a first amplitude modulator coupled to the output of said sum producer, said second channel including a difference producer subtracting signals A and B to produce an output signal A—B, a carrier wave-suppressing second amplitude modulator and an integrating network coupling the output of said difference producer to said second modulator, a carrier wave oscillator coupled to said first and second modulators, means to impart a 90° phase displacement to the carrier wave conveyed in the first channel relative to that in the second channel, said second channel being proportioned to produce a power output not exceeding 10% of the power output of the first channel, and an antenna system coupled to the outputs of the first and second channels.

4. A stereophonic transmitter, as set forth in claim 3, wherein said antenna system coupled to the outputs of the first and second channels is constituted by a common aerial, and further including a diplexer for coupling said common aerial to both of said channels.

5. A stereophonic transmitter, as set forth in claim 3, wherein said means to impart a 90° phase displacement comprises a 90° phase shifting network interposed between said oscillator and one of the modulators.

6. A stereophonic transmitter, as set forth in claim 3, wherein said means to impart a 90° phase displacement comprises a delay line in one of the channels coupled to the output of the modulator therein and having an electrical length equal to an odd number of quarter wavelengths of the carrier wave oscillation.

7. A stereophonic transmitter, as set forth in claim 3, wherein the integrating network in the second channel possesses a limit frequency of between 200 to 300 cycles substantially.

8. A stereophonic transmitter, as set forth in claim 3, further including a high pass filter connected in series with the integrating network and having a limit frequency of between 200 to 300 cycles substantially.

9. A stereophonic transmitter, as set forth in claim 3, further including a resistor for loading said sum producer and wherein the integrating network loading the difference producer has a constant resistive input impedance throughout the transmitted range, the value of the impedance corresponding with the value of said load resistor.

10. A stereophonic transmitter, as set forth in claim 3, wherein said sum producer and said difference producer are constituted by two transformers each having a primary and a secondary, means connecting one terminal of the secondary of one transformer to the center point of the secondary of the other transformer, means to apply the signals A and B to the respective primaries of the two transformers, means to derive the sum input A+B from the other terminal of the first transformer and one of the output terminals of the second transformer respectively.

11. In a stereophonic system, as set forth in claim 3, further including a receiver provided with a high-frequency stage having a bandwidth corresponding to that of a normal amplitude-modulation receiver not exceeding 10 kilocycles, comprising two channels having an amplitude detector and a frequency detector respectively connected thereto, the amplitude detector yielding the sum signals A+B and the frequency detector the difference signals A—B, a sum producer and a difference producer coupled in common to said detectors to recover the coherent signals A and B, and means coupled to said producers to reproduce separately said coherent signals.

12. A stereophonic receiver, as set forth in claim 11, wherein said amplitude detector is constituted by a first mixing stage and said frequency detector by a second mixing stage whose output circuit is provided with differentiating network, means to filter out the carrier wave oscillations from the incoming signal, and means to apply the filtered signal to the first and second mixing stages with a relative phase displacement of 90° whereby the signal applied to the first mixing stage is in phase quadrature with respect to the signal applied to the second mixing stage.

13. A stereophonic receiver, as set forth in claim 11, wherein said two channels are constituted by an amplitude modulation receiving channel provided with a high-frequency stage having a bandwidth of approximately 9 kc./s., the amplitude modulation detector being coupled thereto, and an additional channel coupled to said high-frequency stage and including an amplitude limiter, the frequency detector being coupled to the output of said limiter.

14. A stereophonic recevier, as set forth in claim 11, wherein the sum producer and difference producer are constituted by first and second transformers each having a primary and a secondary, the primaries of the transformers being connected respectively to the outputs of the amplitude and frequency detectors, one terminal of the secondary of the first transformer being connected to the center point on the secondary of the second transformer, the signals A and B being taken from the other output terminal of the first transformer and the output terminals of the second transformer respectively.

References Cited in the file of this patent

UNITED STATES PATENTS

| Number | Name | Date |
|---|---|---|
| 1,666,158 | Affel | Apr. 17, 1928 |

FOREIGN PATENTS

| Number | Country | Date |
|---|---|---|
| 540,185 | Great Britain | Oct. 8, 1941 |

OTHER REFERENCES

"Binaurel Transmission on a Single Channel," by Eastman and Woodward, Electronics, February 1941, pages 34 to 36.